United States Patent [19]

Eastman et al.

[11] 4,389,304
[45] Jun. 21, 1983

[54] CATALYTIC HYDRODESULFURIZATION OR HYDRODENITROGENATION OF ORGANIC COMPOUNDS EMPLOYING ALUMINA PROMOTED WITH ZINC, TITANIUM, COBALT AND MOLYBDENUM AS THE CATALYTIC AGENT

[75] Inventors: Alan D. Eastman; Lloyd E. Gardner, both of Bartlesville, Okla.

[73] Assignee: Phillips Petroleum Company, Bartlesville, Okla.

[21] Appl. No.: 258,237

[22] Filed: Apr. 28, 1981

Related U.S. Application Data

[62] Division of Ser. No. 125,437, Feb. 28, 1980, Pat. No. 4,287,050.

[51] Int. Cl.$^3$ ............................................. C10G 23/02
[52] U.S. Cl. ............................ 208/254 H; 208/216 R; 252/465
[58] Field of Search ...................... 208/254 H, 216 R; 252/465

[56] References Cited

U.S. PATENT DOCUMENTS

| | | | |
|---|---|---|---|
| 3,592,760 | 7/1971 | Young | 208/216 |
| 3,766,058 | 10/1973 | Hensley, Jr. | 208/210 |
| 3,778,365 | 12/1973 | Hamner et al. | 208/120 |
| 3,798,156 | 3/1974 | Hensley, Jr. | 208/216 R |
| 3,849,296 | 11/1974 | Hensley, Jr. | 208/216 R |
| 3,897,365 | 7/1975 | Feins et al. | 208/254 H |
| 3,997,431 | 12/1976 | Beuther et al. | 208/216 |
| 4,008,149 | 2/1977 | Itoh et al. | 208/254 H |
| 4,029,599 | 6/1977 | Pegels | 208/216 R |
| 4,033,861 | 7/1977 | Holloway et al. | 208/254 H |
| 4,052,296 | 10/1977 | Montagnu | 208/254 H |
| 4,333,855 | 6/1982 | Gardner et al. | 208/254 H |

FOREIGN PATENT DOCUMENTS 2153373 5/1973 France .
2312551 5/1975 France .

Primary Examiner—O. R. Vertiz
Assistant Examiner—Wayne A. Langel

[57] ABSTRACT

The catalytic hydrodesulfurization and/or hydrodenitrogenation of an organic sulfur compound and/or an organic nitrogen compound is carried out in the presence of a catalyst composition comprising catalytic grade alumina, titanium, cobalt, zinc and molybdenum.

18 Claims, No Drawings

CATALYTIC HYDRODESULFURIZATION OR HYDRODENITROGENATION OF ORGANIC COMPOUNDS EMPLOYING ALUMINA PROMOTED WITH ZINC, TITANIUM, COBALT AND MOLYBDENUM AS THE CATALYTIC AGENT

This is a division of application Ser. No. 125,437, filed Feb. 28, 1980 now U.S. Pat. No. 4,287,050.

This invention relates to an improved catalytic process for the hydrodesulfurization (HDS) of organic sulfur compounds or the hydrodenitrogenation (HDN) of organic nitrogen compounds, and a catalyst therefor.

Hydrodesulfurization is a process intended primarily to convert the sulfur in organic sulfur compounds to hydrogen sulfide. Hydrodenitrogenation is a process intended primarily to convert the nitrogen in organic nitrogen compounds to ammonia. Hydrodesulfurization and hydrodenitrogenation will generally occur at the same time under similar process conditions if both organic sulfur compounds and organic nitrogen compounds are present in the feed stream. The hydrogen sulfide and/or ammonia can be removed from the feed stream after the hydrodesulfurization and/or hydrodenitrogenation process. Hydrodesulfurization and hydrodenitrogenation are processes which are typically utilized to remove sulfur and nitrogen from a hydrocarbon-containing feedstock which also contains organic sulfur compounds and/or organic nitrogen compounds to produce fuels which, when burned, will meet environmental standards. The processes may be applied to feed streams other than hydrocarbon-containing feeds if organic sulfur compounds and/or organic nitrogen compounds are present and the removal of sulfur and/or nitrogen is desired.

The earliest hydrodesulfurization and/or hydrodenitrogenation catalysts were bauxite and Fuller's earth. Later, catalysts containing cobalt molybdate on alumina and nickel tungstate on alumina substantially replaced the earlier catalyst and these catalysts are still used very extensively.

Both hydrodesulfurization and hydrodenitrogenation processes require substantial energy because of the elevated temperatures required and also require substantial volumes of hydrogen which is expensive. Hydrogen is required to convert the sulfur in organic sulfur compounds to hydrogen sulfide and to convert the nitrogen in organic nitrogen compounds to ammonia. If the feed stream containing the organic sulfur compounds and/or organic nitrogen compounds also contains aromatics, substantial hydrogen man be consumed in hydrogenating aromatics which is undesirable. Thus, a good hydrodesulfurization or hydrodenitrogenation catalyst is one which shows substantial activity at lower temperatures so as to require less energy and also exhibits good selectivity for the consumption of hydrogen so as to reduce the hydrogenation of aromatics if aromatics are present in the feed stream which contains the organic sulfur compounds and/or organic nitrogen compounds. The reduced hydrogenation of aromatics results in a lower consumption of hydrogen and a higher quality desulfurized and/or denitrogenized aromatic containing feedstock.

It is thus an object of this invention to provide an improved hydrodesulfurization and/or hydrodenitrogenation catalyst which exhibits high activity and good selectivity to thus provide an improved process for the hydrodesulfurization and/or hydrodenitrogenation of organic compounds.

In accordance with the present invention, catalytic grade alumina to which titanium, cobalt, zinc and molybdenum have been added is utilized as a catalyst in a hydrodesulfurization and/or hydrodenitrogenation process. The hydrodesulfurization and/or hydrodenitrogenation process is carried out under suitable conditions. The catalyst composition exhibits substantial activity for hydrodesulfurization and/or hydrodenitrogenation and also exhibits improved selectivity for the consumption of hydrogen over the conventional cobalt molybdate on alumina catalyst. This results in a decreased hydrogenation of aromatics, where aromatics are present, which reduces the volume of hydrogen required by the hydrodesulfurization and/or hydrodenitrogenation process.

The hydrodesulfurization and/or hydrodenitrogenation process is preferably carried out in cycles consisting of a reaction period and a regeneration period for the catalyst. The reaction period comprises contacting a feedstock which contains organic sulfur compounds and/or organic nitrogen compounds with the catalyst to thereby convert the sulfur in organic sulfur compounds in the feedstock to hydrogen sulfide and also convert the nitrogen in organic nitrogen compounds to ammonia. After the reaction period, an oxygen-containing gas is passed in contact with the catalyst to regenerate the catalyst by burning off carbonaceous materials which may have formed on the catalyst.

Other objects and advantages of the invention will be apparent from the foregoing brief description of the invention and the appended claims, as well as the detailed description of the invention which follows.

Any suitable organic sulfur compound may be hydrodesulfurized in accordance with the present invention. Suitable organic sulfur compounds include sulfides, disulfides, mercaptans, thiophenes, benzothiophenes, dibenzothiophenes and the like and mixtures of two or more thereof.

Any suitable organic nitrogen compound may be hydrodenitrogenized in accordance with the present invention. Suitable organic nitrogen compounds include amines, diamines, pyridines, quinolines, porphyrins, benzoquinolines and the like and mixtures of two or more thereof.

Organic sulfur compounds and/or organic nitrogen compounds contained in any suitable fluid stream may be hydrodesulfurized and/or hydrodenitrogenized in accordance with the present invention. Suitable fluid streams include light hydrocarbons such as methane, ethane, ethylene and natural gas, gases such as hydrogen and nitrogen, gaseous oxides of carbon, steam, and the inert gases such as helium and argon.

The invention is particularly directed to hydrocarbon-containing feed streams which also contain organic sulfur compounds and/or organic nitrogen compounds. Suitable hydrocarbon-containing feeds include not only those hydrocarbon containing feeds previously mentioned but also petroleum products and products from extraction and/or liquefaction of coal and lignite, products from tar sands, products from shale oil and similar products. Suitable hydrocarbons include naphtha, distillates, gas oil having a boiling range from about 205° to about 538° C., topped crude having a boiling range in excess of about 343° C. and residuum.

The hydrodesulfurization and/or hydrodenitrogenation catalyst employed in the process of the present invention is a calcined composition comprising catalytic grade alumina to which titanium, cobalt, zinc and molybdenum have been added. The titanium, cobalt, zinc and molybdenum may be present in the oxide form ($TiO_2$, $Co_3O_4$, $ZnO$, and $MoO_3$). The cobalt and molybdenum may also be present as cobalt molybdate ($CoMoO_4$). The zinc and titanium may also be present as zinc titanate ($Zn_2TiO_4$). Any suitable concentration of the oxides of titanium, cobalt, zinc and molybdenum may be utilized. The total concentration of the oxides of titanium, cobalt, zinc and molybdenum preferably ranges from about 3 to about 35 weight percent based on the total catalyst weight. Any suitable atomic ratio Zn:Ti or Co:Mo of zinc to titanium or cobalt to molybdenum may be utilized. The atomic ratio of zinc to titanium preferably ranges from about 1:1 to about 3:1 and will more preferably range from about 1.8:1 to about 2.2:1. The atomic ratio of cobalt to molybdenum preferably ranges from about 0.1:1 to about 3:1 and will more preferably range from about 0.6:1 to about 7.7:1. The concentration of the zinc oxide plus the titanium oxide preferably ranges from about 2 to about 25 weight percent based on the weight of the total catalyst composition and will more preferably range from about 5 to about 15 weight percent based on the weight of the total catalyst composition. The concentration of cobalt oxide plus molybdenum oxide preferably ranges from about 2 to about 25 weight percent based on the weight of the total catalyst composition and will more preferably range from about 10 to about 20 weight percent based on the weight of the total catalyst composition.

Any catalytic grade alumina known in the art can be utilized including the forms of catalytic grade alumina known as eta- or gamma-alumina.

Either the elemental form of the promoters or any suitable compound of the promoters may be used to form the catalyst composition.

Titanium compounds suitable for use as a promoter are titanyl sulfate, titanium tetraalkoxide ($Ti(OR)_4$) where R can be ethyl, isopropyl or the like, or other soluble titanium compounds including the halides and the oxyhalides and the like and mixtures of any two or more thereof.

Cobalt compounds suitable for use as a promoter are cobalt acetate, cobalt carbonate, cobalt nitrate, cobalt oxide, cobalt sulfate, cobalt thiocyanate, and the like and mixtures of two or more thereof.

Zinc compounds suitable for use as a promoter are zinc acetate, zinc nitrate, zinc carbonate, zinc sulfate, zinc oxide, and the like and mixtures of two or more thereof.

Molybdenum compounds suitable for use as a promoter are ammonium molybdate, ammonium heptamolybdate, sodium molybdate, potassium molybdate, molybdenum oxides such as molybdenum (IV) oxide and molybdenum (VI) oxide and the like and mixtures of two or more thereof.

The promoting elements can be added to the catalyst by any method known in the art. The titanium, cobalt, zinc, and molybdenum may be added individually by impregnating the alumina with a solution—aqueous or organic—that contains a promoting element. The catalytic grade alumina can be 1/32" or larger extrudate, preferably about 1/16" extrudate, although this is not required. After the promoting element has been added to the catalytic grade alumina, the catalyst composition is dried. For the titanium, the treated catalyst is preferably treated with a base from a Group IA element such as sodium hydroxide or potassium carbonate before drying. The catalyst composition is then washed to remove sulfates or halogens before proceeding to the drying step. After drying to remove essentially all the solvent, a solution of another promoting element is added by impregnation. These processes are repeated until all four elements have been added to the alumina. However, the treatment with a base from a Group IA element is preferably utilized only for the addition of the titanium compounds. The sequence in which the promoting elements are added is immaterial. After all the promoting elements have been added, the catalyst composition is calcined in the presence of oxygen at a temperature in the range of about 500° to about 650° C. until volatile matter is removed and the promoting elements are substantially converted to their oxides. The time required for the calcining step may range from about 0.1 to about 10 hours. It is noted that cobalt molybdate on alumina is a commercially available material. If the commercially available cobalt molybdate on alumina is utilized, then only the zinc and titanium need be added to the catalyst composition.

The promoting elements can also be added to the alumina by first combining zinc and titanium to form zinc titanate. The zinc titanate is then added to the alumina in the same manner as previously described. The alumina to which zinc titanate has been added is then treated with cobalt and molybdenum, which may be in the form of cobalt molybdate, as has been previously described. After the zinc titanate, cobalt and molybdenum have been added to the alumina, the catalyst composition is again calcined in the presence of oxygen at a temperature in the range of about 500° C. to about 650° C. to convert the cobalt and molybdenum to their oxides if the cobalt and molybdenum have been added individually or in a form other than an oxide. The time required for the calcining step will again range from about 0.1 to about 10 hours.

The zinc titanate may be prepared by intimately mixing suitable portions of zinc oxide and titanium dioxide, preferably in a liquid such as water, and calcining the mixture in the presence of free oxygen at a temperature in the range of about 650° C. to about 1050° C., preferably in the range of about 675° C. to about 975° C. A calcining temperature in the range of about 800° C. to about 850° C. is most preferred because the surface area of the catalyst is maximized in this temperature range thus producing a more active catalyst. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active catalyst. Preferably the titanium dioxide has an average particle size of less than 100 millimicrons and more preferably less than 30 millimicrons. Flame hydrolyzed titanium dioxide has extremely small particle size and is particularly preferred in preparing the catalyst.

The zinc titanate may also be prepared by coprecipitation from aqueous solutions of a zinc compound and a titanium compound. The aqueous solutions are mixed together and the hyroxides are precipitated by the addition of an alkali metal hydroxide. The precipitate is then washed, dried and calcined as described in the preceding paragraph. This method of preparation is less preferred than the mixing method because the zinc titanate prepared by the coprecipitation method is softer than the zinc titanate prepared by the mixing method.

The surface area of the catalyst increases as the catalyst becomes sulfided and reaches a maximum when the catalyst is completely sulfided. The catalyst may become sulfided during the hydrodesulfurization process or may be presulfided. The catalyst is preferably presulfided even if the catalyst is to be used only for hydrodenitrogenation. The presulfiding of the catalyst is preferred before the catalyst is initially used and after each regeneration of the catalyst. Preferably, the catalyst is presulfided in two steps. The catalyst is first treated with a mixture of hydrogen sulfide in hydrogen at a temperature in the range of about 175° C. to about 225° C., preferably about 205° C. The temperature in the catalyst composition will rise during this first presulfiding step and the first presulfiding step is continued until the temperature rise in the catalyst has substantially stopped or until hydrogen sulfide is detected in the effluent flowing from the reactor. The mixture of hydrogen sulfide and hydrogen preferably contains in the range of about 5 to about 20 percent hydrogen sulfide, preferably 10 percent hydrogen sulfide.

The second step in the presulfiding process consists of repeating the first step at a temperature in the range of about 350° C. to about 400° C., preferably about 370° C. It is noted that other mixtures containing hydrogen sulfide may be utilized to presulfide the catalyst. Also the use of hydrogen sulfide is not required. In a commercial operation, it is common to utilize a light naphtha containing sulfur to presulfide the hydrodesulfurization and/or hydrodenitrogenation catalyst.

The process of this invention can be carried out by means of any apparatus whereby there is achieved a contact with the catalyst of the organic compounds to be hydrodesulfurized and/or hydrodenitrogenized. The process is in no way limited to the use of a particular apparatus. The process of this invention can be carried out using a fixed catalyst bed, fluidized catalyst bed, or moving catalyst bed. Presently preferred is a fixed catalyst bed.

In order to avoid any casual mixing of the feed stream containing the organic sulfur compound and/or organic nitrogen compound and the oxygen-containing fluid utilized in the regeneration step, provision is preferably made for terminating the flow of feed to the reactor and injecting an inert purging fluid such as nitrogen, carbon dioxide or steam. Any suitable purge time can be utilized. The purge duration will be of sufficient length to completely remove hydrogen and hydrocarbons. Any suitable flow rate of the purge fluid may be utilized. Presently preferred is a purge fluid flow rate in the range of about 800 GHSV to about 1200 GHSV.

Any suitable temperature for the hydrodesulfurization and/or hydrodenitrogenation of the organic sulfur compounds and/or organic nitrogen compounds over the catalyst composition of the present invention can be utilized. The temperature will generally be in a range of about 205° C. to about 538° C. and will more preferably be in the range of about 316° C. to about 427° C. for the hydrodesulfurization process and/or the hydrodenitrogenation process.

Any suitable pressure for the hydrodesulfurization and/or hydrodenitrogenation of the organic sulfur compounds and/or organic nitrogen compounds over the catalyst composition of the present invention can be utilized. In general, the pressure will be in the range of about 200 to about 3000 psig total system pressure for the hydrodesulfurization process and/or the hydrodenitrogenation process. The total system pressure is the sum of the partial pressure of the feedstock plus the partial pressure of the added hydrogen. Preferably the total system pressure will range from about 400 to about 1000 psig for the hydrodesulfurization process and/or the hydrodenitrogenation process.

Any suitable quantity of hydrogen can be added to the hydrodesulfurization and/or hydrodenitrogenation process. The quantity of hydrogen used to contact the feedstock containing the organic compounds being hydrodesulfurized and/or hydrodenitrogenized will be in the range from about 100 to about 10,000 SCF/bbl and will more preferably be in the range from about 500 to about 3000 SCF/bbl.

Any suitable residence time for the feedstock in the presence of the catalyst composition of the present invention can be utilized. In general, the residence time in terms of the volumes of liquid per volume of catalyst per hour (LHSV) can range from about 0.1 to about 20 and will more preferably range from about 1 to about 5 for both the hydrodesulfurization process and/or the hydrodenitrogenation process.

To maintain the activity of the hydrodesulfurization and/or hydrodenitrogenation catalyst, the temperature of the hydrodesulfurization and/or hydrodenitrogenation process is gradually increased to compensate for loss of catalyst activity due to fouling of the catalyst. When the temperature of the hydrodesulfurization and/or hydrodenitrogenation process cannot conveniently be increased further, the catalyst is typically regenerated by terminating the flow of feed to the reactor and purging with an inert fluid such as nitrogen to remove combustibles and then introducing free oxygen-containing fluid to oxidize the carbonaceous deposits which have formed on the catalyst during the hydrodesulfurization and/or hydrodenitrogenation process. The catalyst will generally be utilized for a year or longer before being regenerated.

The amount of oxygen, from any source, supplied during the regeneration step will be in an amount sufficient to remove carbonaceous materials from the catalyst. The regeneration step is conducted at generally the same pressure recited for the hydrodesulfurization and/or hydrodenitrogenation step. The temperature for the regeneration step is preferably maintained in the range of about 425° C. to about 650° C. If the hydrodesulfurization and/or hydrodenitrogenation process has been proceeding at a temperature lower than 425° C., the temperature of the catalyst should be increased to about 425° C. prior to the start of the regeneration of the catalyst in order to remove any carbonaceous deposits on the catalyst within a reasonable time. After regeneration is complete the pre-sulfiding procedure is repeated for optimum catalyst activity.

The following examples are presented in further illustration of the invention.

EXAMPLE I

Preparation of the catalysts of this invention is illustrated by the following. Shell-344, a commercially produced cobalt molybdenum on catalytic grade alumina hydrotreating catalyst, was modified by the addition of zinc and titanium. To 40 g of the Shell-344 catalyst was added a solution containing 5.0 g titanium (IV) ethoxide in ethanol. After drying at 125° C. the resulting catalyst composition was again impregnated with an aqueous solution containing 11.7 g of zinc nitrate hexahydrate. After removing the water by drying at 125° C., the resulting catalyst composition was calcined for 18 hours in air at 538° C. This catalyst composition (hereinafter designated A) was calculated to contain, based on the weight of the total catalyst composition, 3.87 weight percent $TiO_2$, 7.12 weight percent ZnO, 2.67 weight percent CoO, and 12.84 weight percent $MoO_3$, the balance being alumina. The atomic ratio of zinc to titanium in catalyst A was 1.8:1 while the atomic ratio of cobalt to molybdenum was 0.4:1. Before impregnation with titanium and zinc, the Shell-344 (hereinafter designated S) had these pertinent properties: 0.79 g/cc bulk density, 0.5 cc/g pore volume, 186 $m^2$/g surface area, and it contained 2.99 weight percent CoO and 14.42 weight percent $MoO_3$.

EXAMPLE II

Catalysts A and S were used to hydrodesulfurize and hydrodenitrogenize a blend of distillate plus cycle oil, referred to hereinafter as feedstock, that contained 0.75 weight percent organic sulfur and 221 ppm (by weight) organic nitrogen. Runs were made in an automated test unit capable of testing six catalysts simultaneously. Six reactors 1" o.d. ×0.813" i.d. and made of 316 stainless steel were disposed symmetrically in a single furnace. The reactors operated with a fixed catalyst bed in down-flow mode. Feedstock preheat lines ran upflow through the furnace, entering the tops of the reactors where the feedstock was mixed with added hydrogen. Conditions in the reactors were mixed phase, i.e., trickle bed process. Runs were made with 25 cc of catalyst, or with 5 cc of catalyst plus 20 cc of inert diluent (corundum). Contact time of feedstock with catalyst, in terms of volume of feedstock per volume of catalyst per hour (LHSV) was varied by either varying the feedstock pump setting or by the use of diluted catalyst.

The procedure followed to evaluate a catalyst was to first make a temperature survey. After presulfiding with 10 percent hydrogen sulfide in hydrogen, the catalyst was used to hydrodesulfurize and hydrodenitrogenize the feed at 750° F., 800° F., 600° F., 650° F., 700° F., and 750° F. Comparison of the first and last tests indicated changes in activity during the survey. Following the completion of the temperature survey, the catalyst was regenerated with free oxygen-containing gas and again presulfided at 204° C. and 372° C. with 10 percent hydrogen sulfide in hydrogen.

Table I summarizes results of runs with catalysts A and S. Runs where the catalyst had not previously contacted the hydrocarbon feedstock are labeled Fresh; runs where the catalyst had been processed through the temperature survey, then regenerated and resulfided are labeled Regenerated. All runs were made at 5.0 LHSV, 500 psig, with 500 SCF hydrogen/bbl feed. Except for run 4, all catalysts were presulfided first at 204° C. until hydrogen sulfide was detected in the effluent flowing from the reactor, then at 372° C. until hydrogen sulfide was detected in the effluent flowing from the reactor. Runs 1–2, 3–5, 6–7, 8–9 and 10–11 provide direct comparisons between catalysts A and S at comparable reaction conditions. Runs 3 and 4 compare different conditions to presulfided catalyst A. At least part of the data in Table I is excerpted from temperature survey runs and the values for "Carbon on Catalyst" are based on the complete survey and not for just the temperature cited. Direct comparison is justified because the catalysts were treated identically during the runs. Only portions of the results of the temperature survey are reported in Table I because all the information displayed in Table I was not obtained for all the runs in the temperature survey.

TABLE I

| Run | 1 | 2 | 3 | 4 | 5 | 6 | 7 | 8 | 9 | 10 | 11 |
|---|---|---|---|---|---|---|---|---|---|---|---|
| Catalyst | A | S | A | A | S | A | S | A | S | A | S |
| Temperature, °F. | 650 | 650 | 650 | 650 | 650 | 700 | 700 | 700 | 700 | 750 | 750 |
| Sulfur removed, wt. % | 89.2 | 88.5 | 90.9 | 92.8 | 92.3 | 95.7 | 92.4 | 96.7 | 91.3 | 97.3 | 98.8 |
| Nitrogen removed, wt. % | 74.3 | 82.0 | 63.3 | 62.6 | 80.1 | 85.6 | 86.9 | 81.8 | 79.7 | 88.7 | 90.5 |
| 500° F. + converted, wt. %* | 5.9 | 8.8 | 7.6 | 1.1 | 8.5 | 9.6 | 10.9 | 5.2 | 10.7 | 6.3 | 6.5 |
| $H_2$ consumed, SCF/bbl | 180 | 190 | 130 | 160 | 190 | 180 | 210 | 200 | 220 | 150 | 200 |
| Product Inspection: | | | | | | | | | | | |
| Sulfur, wt. % | 0.081 | 0.086 | 0.068 | 0.054 | 0.058 | 0.032 | 0.057 | 0.025 | 0.065 | 0.020 | 0.009 |
| Nitrogen, ppm | 57 | 40 | 81 | 70 | 44 | 32 | 29 | 34 | 38 | 25 | 21 |
| Saturates/aromatics, wt. | 1.66 | 1.73 | 1.32 | 1.46 | 1.80 | 1.70 | 1.92 | 1.92 | 2.01 | 1.41 | 1.92 |
| Polyaromatics, wt. % | 11.4 | 11.3 | 14.0 | 12.5 | 11.2 | 11.6 | 10.6 | 10.9 | 10.2 | 13.2 | 11.1 |
| Carbon on Catalyst, wt. % | 2.34 | 2.66 | 1.81 | N.D. | 2.14 | 2.34 | 2.66 | 1.79 | 1.88 | 1.81 | 2.14 |
| Catalyst-Fresh/Regenerated | F | F | R | R** | R | F | F | R | R | R | R |

*Feedstock contained 46% of >500° F. by simulated distillation (GLC). Numbers cited here are the percentage of the >500° F. fraction converted to <500° F.
**Presulfided at 399° C. with 10% $H_2S$ in $H_2$, 120 cc/min, 1.0 atm.

Comparison of the comparable runs set forth in Table I shows that catalysts A and S are very similar with respect to hydrodesulfurization and hydrodenitrogenation activity—sometimes one and sometimes the other was superior in the comparison. The other data in Table I, however, show catalyst A to be consistently more selective than catalyst S with respect to hydrocracking, i.e., conversion of >500° F. fraction to <500° F. product is lower with catalyst A. Catalyst A also consumed less hydrogen as shown by direct measurement and also by inspection of the analyses for Saturates/Aromatics and for the concentration of Polyaromatics. The former is consistently lower for catalyst A showing lower hydrogenation of aromatics. The latter shows the products from catalyst A to contain more polyaromatics than do the products from catalyst S, confirming less hydrogenation of aromatics. Also, less coke was deposited on catalyst A in comparable runs.

EXAMPLE III

Table II summarizes results from runs using catalysts A and S, both fresh and regenerated as described in Example II. Runs were made using the feedstock described in Example II and using the same apparatus and experimental conditions that were also described in Example II. Runs 14, 15, and 16 in Table II are from the same experiments as runs 4, 8, and 9 in Table I. In Table II runs 12-13, 14-16, and 17-18 provide a direct comparison between catalysts A and S. Run 15 was made using catalyst A that had been used and regenerated three times rather than only once; the results show that its activity at the five temperatures examined improved or remained unchanged by this treatment. Other runs in Table II show that hydrodesulfurization and hydrodenitrogenation activity of catalyst A generally increases by use and regeneration of fresh catalysts. Runs 17 and 18 show that presulfiding under reaction conditions with the feedstock generally improves the hydrodesulfurization and hydrodenitrogenation activity of catalyst A more than it does catalyst S.

TABLE II

| Run | 12 | 13 | 14 | 15 | 16 | 17 | 18 |
|---|---|---|---|---|---|---|---|
| Catalyst | A | S | A | A | S | A | S |
| Fresh/Regenerated | F | F | R | 3R* | R | F | F |
| Pretreatment | (1) | (1) | (2) | (2) | (2) | (3) | (3) |
| Hydrodesulfurization, wt. % of sulfur initially present | | | | | | | |
| 600° F. | 66.9 | 84.4 | 87.9 | 88.5 | 87.1 | 48.5 | 43.5 |
| 650° | 87.7 | 92.3 | 92.8 | 93.9 | 90.8 | 72.7 | 69.3 |
| 700° | 93.7 | 95.6 | 96.9 | 96.7 | 91.3 | 94.8 | 81.6 |
| 750° | 98.3 | 98.7 | 98.4 | 97.9 | 95.9 | 90.5 | 88.7 |
| 800° | 98.7 | 98.5 | 98.8 | 98.9 | 98.3 | 96.4 | 94.0 |
| Hydrodenitrogenation, wt. % of nitrogen initially present | | | | | | | |
| 600° F. | 58.8 | 66.1 | 72.4 | 78.7 | 76.9 | 62.9 | 62.0 |
| 650° | 62.9 | 78.7 | 68.3 | 82.8 | 82.8 | 75.1 | 62.0 |
| 700° | 81.9 | 78.3 | 74.7 | 84.6 | 82.8 | 62.4 | 73.8 |
| 750° | 81.0 | 83.7 | 77.8 | 87.8 | 82.8 | 70.6 | 71.5 |
| 800° | 79.2 | 79.6 | 68.8 | 83.3 | 79.2 | 71.0 | 69.7 |
| Carbon on Catalyst, wt. % | 1.40 | 2.12 | N.D. | 1.79 | 1.88 | N.D. | N.D. |

*Regenerated three times before this run.
(1) Presulfided with 10% $H_2S$ in hydrogen at 399° C., 120 cc/min, 1.0 atm.
(2) Presulfided with 10% $H_2S$ in hydrogen at 204° C., then at 371° C., 120 cc/min, 1.0 atm.
(3) Presulfided with refinery feed blend for 24 hours at 399° C., 500 psig, and 5000 SCF $H_2$/bbl feed.

EXAMPLE IV

In addition to comparing the activity of a commercial cobalt molybdate on alumina catalyst with the same material to which zinc and titanium had been added as outlined in the previous examples, similar tests were made on two catalysts prepared by impregnating Catapal catalyst grade activated alumina. The method used was to immerse a weighed portion of previously dried alumina having a known pore volume in a measured volume of solution of promoting element of known concentration. After standing one hour at about 25° C. excess solution was removed by decanting or filtering. The quantity of promoter added by this procedure was considered to be calculable from the volume of solution retained in the alumina's pores.

To form a catalyst referred to as catalyst B, 36.4 g Catapal alumina was impregnated with 41 ml of aqueous ammonium molybdate containing 11.88 g $(NH_4)_6Mo_7O_{24}.4H_2O$/100 ml solution. After drying at 125° C. it was calcined in air for 4 hours at 538° C. 43.8 g of this preparation was impregnated with 40 ml of aqueous cobalt nitrate containing 10.54 g $Co(NO_3)_2.6H_2O$/100 ml solution. This was dried at 125° C. and calcined in air for 4 hours at 538° C. Finally the Co:Mo ratio was adjusted by impregnating a 20.1 g portion of the final preparation with a solution containing 10.8 g $Co(NO_3)_2.6H_2O$/100 ml solution and again drying and calcining. Chemical analysis showed catalyst B to contain 5.35 weight percent CoO and 12.84 weight percent $MoO_3$. The atomic ratio of cobalt to molybdenum in catalyst B was 0.8:1.

To form a catalyst referred to as catalyst C, 40 g Catapal alumina was impregnated with a solution of 5.0 g Ti (IV) ethoxide in ethanol. Ethanol was removed by drying, and the dried material was reimpregnated with an aqueous solution containing 11.7 g $Zn(NO_3)_2.6H_2O$. After drying in an oven the resulting preparation was calcined in air for about 2 hours at 538° C. When cool, 43.3 g of this preparation was impregnated with 42 ml of aqueous ammonium molybdate containing 11.88 g $(NH_4)_6Mo_7O_{24}.4H_2O$/100 ml solution. After drying and calcining, the resulting preparation was impregnated with 41 ml of aqueous cobalt nitrate containing 10.54 g $Co(NO_3)_2.6H_2O$/100 ml solution. After again drying and calcining, a 20.3 g portion was impregnated with 21 ml of aqueous cobalt nitrate that contained 7.58 g $Co(NO_3)_2.6H_2O$/100 ml solution. After final drying and calcining at 538° C., a sample of catalyst C, by actual chemical analysis, was shown to contain 4.08 weight percent CoO, 10.14 weight percent $MoO_3$, 3.47 weight percent $TiO_2$, and 5.90 weight percent ZnO. The atomic ratio of zinc to titanium in catalyst C was 1.67:1 while the atomic ratio of cobalt to molybdenum was 0.77:1.

Catalysts B and C were used to hydrodesulfurize and hydrodenitrogenize a feedstock which was a blend of 70% straight run distillate and 30% light cycle oil having boiling range 216°-714° F. as determined by ASTM method D-2887-73. The feedstock contained 47.7 weight percent >500° F. fraction, 0.75 weight percent sulfur, and 221 ppm nitrogen. All runs reported in Table III were made on catalyst samples that had been regenerated twice and were presulfided with 10% hydrogen sulfide in hydrogen at 204° C., then at 371° C. The 10% hydrogen sulfide in hydrogen gas flowed at 120 cc/min. at 1.0 atm. Runs were made at 500 psig pressure, 5.0 LHSV using 5000 SCF hydrogen/bbl feed, and were 16 hours in duration. Tests on each catalyst were part of a temperature survey. Carbon deposited on the catalyst was measured at the end of the survey. Catalyst B contained 2.04 weight percent carbon; catalyst C contained 1.68 weight percent carbon.

TABLE III

| Run | | 19 | 20 | 21 | 22 | 23 | 24 |
|---|---|---|---|---|---|---|---|
| Catalyst | B | C | B | C | B | C | |
| Temperature, °F. | | 600 | 600 | 700 | 700 | 750 | 750 |
| Hydrodesulfurization, wt. % | | 91.6 | 90.7 | 96.0 | 95.7 | 95.1 | 97.3 |
| Hydrodenitrogenation, wt. % | | 83.7 | 84.6 | 81.4 | 87.8 | 79.6 | 82.8 |
| >500° F. converted, % | | 15.5 | 10.7 | 9.0 | 10.9 | 11.7 | 8.8 |
| $H_2$ consumed, SCF/bbl | | 156 | 110 | 183 | 167 | 174 | 106 |
| Product Inspection: | Feed | | | | | | |

TABLE III-continued

| Sulfur, wt. % | 0.75 | 0.063 | 0.070 | 0.030 | 0.032 | 0.037 | 0.020 |
|---|---|---|---|---|---|---|---|
| Nitrogen, ppm | 221 | 36 | 34 | 41 | 27 | 45 | 38 |
| Saturates/- Aromatics, wt. | 2.18 | 2.24 | 2.10 | 2.13 | 2.13 | 2.15 | 2.02 |
| Polyaromatics, wt. % | 18.0 | 12.6 | 15.0 | 11.5 | 12.2 | 11.9 | 14.8 |

Comparison of results from catalysts B and C at the three temperatures used again shows both to be about equally active for hydrodesulfurization and hydrodenitrogenation. However, catalyst C again is shown to be more selective by accumulating less coke, by cracking less of the feedstock, and by consuming less hydrogen, as shown by direct measurement and inferred from the product inspection analyses.

EXAMPLE V

Runs were also made using cobalt molybdate on alumina that had been promoted with zinc oxide only, titanium dioxide only, or with zinc oxide plus titanium dioxide. These catalysts were prepared by impregnating $-30+40$ mesh Harshaw 1404 alumina using the same procedure and the same reagents that were used for catalyst C in Example IV. The calculated compositions of the catalysts employed in this example are shown in Table IV.

TABLE IV

| Catalyst | D | E | F |
|---|---|---|---|
| CoO, wt. % | 6.1 | 6.7 | 4.1 |
| $MoO_3$, wt. % | 18.0 | 18.5 | 10.2 |
| ZnO, wt. % | 5.6 | nil | 6.1 |
| $TiO_2$, wt. % | nil | 3.1 | 3.3 |

These catalysts were used to hydrodesulfurize and hydrodenitrogenize the feedstock described in Table III and Example IV. As before, runs were made at 500 psig pressure, 5.0 LHSV, with 5000 SCF hydrogen/bbl feed. Before making these runs, the catalysts were presulfided at 399° C. and these reaction conditions for 10 hours. Table V summarizes results of runs with catalysts D, E, and F.

TABLE V

| Run | 25 | 26 | 27 |
|---|---|---|---|
| Catalyst | D | E | F |
| Hydrodesulfurization, wt. % | | | |
| 600° F. | 72.3 | 77.9 | 83.6 |
| 650° | 81.7 | 86.5 | 90.8 |
| 700° | 90.7 | 92.5 | 95.5 |
| 750° | 94.7 | 96.1 | 97.1 |
| 800° | 96.8 | 97.9 | 96.8 |
| Average % HDS (600-800° F.) | 87.2 | 90.2 | 92.8 |
| Average % HDN (600-800° F.) | 64.0 | 61.6 | 69.4 |

Catalyst F, which contains both zinc oxide and titanium dioxide, was shown to be more active for both hydrodesulfurization and hydrodenitrogenation than catalysts D and E.

EXAMPLE VI

Runs were also made using a catalyst that had been prepared by mixing preformed zinc titanate with alumina, converting to an extrudate, and impregnating with cobalt and molybdenum. This catalyst, designated catalyst G, was prepared by combining 83 g of powdered zinc titanate ($Zn_2TiO_4$) with 500 g of Catapal alpha-alumina monohydrate (boehmite) and 3 g of methyl cellulose. These dry solids were mixed in a twin shell blender, passed three times through a Raymond hammer mill, then treated with 230 ml of 0.31 N nitric acid. After mixing in a Sigma mixer, the product was extruded from a Greenlee hydraulic extruder through a 1/16" orifice and dried in a forced draft oven at 250° F. The composition was then calcined in air in a muffle furnace at 1000° F. for several hours and the extrudates were chopped to about 5 mm lengths. The composition was then impregnated with molybdenum by being added to an excess of of solution prepared by dissolving 184 g of $(NH_4)_6Mo_7O_{24}.4H_2O$ and 10 ml of concentrated ammonium hydroxide in sufficient water to make 500 ml of solution. After five minutes of soaking, excess solution was separated on a Buchner funnel filter. The treated catalyst was dried in an oven at 250° F. and calcined for 2 hours in air at 1000° F. in a muffle furnace. Cobalt was then added by soaking the catalyst for 15 minutes in a solution prepared by dissolving 125 g of $Co(NO_3)_2.6H_2O$ in sufficient water to make 317 ml of solution. Excess solvent was again separated on a Buchner funnel filter and the catalyst was dried and calcined as in the preceding step.

By analysis catalyst G was found to contain 3.9 weight percent CoO, 15.5 weight percent $MoO_3$, 9.6 weight percent ZnO, 4.3 weight percent $TiO_2$, with the remainder being $Al_2O_3$. The atomic ratio of zinc to titanium in catalyst G was 2.19:1 while the atomic ratio of cobalt to molybdenum was 0.48:1. Its surface area was 145 $m^2/g$.

Catalyst G was used in runs to hydrodesulfurize and hydrodenitrogenize the feedstock described in Example II using the same apparatus described there. All runs were made at 5.0 LHSV, 500 psig, with 500 SCF hydrogen/bbl feed. The catalyst was presulfided in the manner set forth in Example II. Comparative runs were also made using American Cyanamid HDS-20A catalyst, a state of the art hydrodesulfurization catalyst, at nearly identical conditions. The latter, designated catalyst H, comprised 4.95 weight percent CoO and 15.9 weight percent $MoO_3$ with the balance being $Al_2O_3$. Its surface area was 241 $m^2/g$. A $-20+40$ mesh size fraction of each catalyst was used for the comparative runs.

Table VI summarizes pertinent results from these runs, made at five different temperatures in the range 550°-750° F. Except for the two lowest temperatures where the commercial catalyst exhibited more hydrodesulfurization activity the two catalysts showed essentially identical hydrodesulfurization activity despite the fact that the commercial catalyst possessed a much higher surface area. At all temperatures hydrogen consumption by inventive catalyst G was significantly less than for the commercial catalyst. This is also reflected in the properties of the product—that from catalyst G having consistently lower saturated/aromatics ratio and consistently higher concentration of polyaromatics (determined by mass spectrometry), indicating a lower consumption of hydrogen via hydrogenation of the hydrocarbon.

TABLE VI

| Catalyst | G | G | G | G | G | H | H | H | H | H |
|---|---|---|---|---|---|---|---|---|---|---|
| Run | 28 | 29 | 30 | 31 | 32 | 33 | 34 | 35 | 36 | 37 |
| Temperature, °F. | 548 | 602 | 651 | 701 | 750 | 557 | 660 | 650 | 707 | 749 |
| Hydrodesulfurization, wt. %* | 61.3 | 83.6 | 92.3 | 95.6 | 96.4 | 80.1 | 88.3 | 93.0 | 95.5 | 97.0 |
| H$_2$ Composition, SCF/bbl | 132 | 161 | 227 | 190 | 181 | 163 | 196 | 246 | 245 | 197 |
| Product |  |  |  |  |  |  |  |  |  |  |
| S, wt. % | 0.271 | 0.115 | 0.054 | 0.031 | 0.025 | 0.141 | 0.083 | 0.050 | 0.032 | 0.021 |
| Saturates/Aromatics, wt. | 1.12 | 1.43 | 1.86 | 2.04 | 1.58 | 1.38 | 1.63 | 2.37 | 2.05 | 1.70 |
| Polyaromatics, wt. % | 13.2 | 12.2 | 9.5 | 9.5 | 11.5 | 12.1 | 10.8 | 8.7 | 8.8 | 10.8 |

*Hydrodenitrogenation was not measured for these runs.

Reasonable variations and modifications are possible within the scope of the disclosure and the appended claims to the invention.

That which is claimed:

1. A process for the catalytic hydrodenitrogenation of an organic nitrogen compound comprising the step of contacting said organic nitrogen compound under suitable hydrodenitrogenation conditions with a catalyst composition comprising catalytic grade alumina, zinc titanate, cobalt, and molybdenum.

2. A process in accordance with claim 1 wherein said organic nitrogen compound is selected from the group consisting of amines, diamines, pyridines, quinolines, porphyrins, benzoquinolines, and mixtures of any two or more thereof.

3. A process in accordance with claim 1 wherein said catalyst composition is prepared by calcining a mixture of zinc oxide and titanium dioxide in the presence of free oxygen at a temperature in the range of about 650° C. to about 1050° C. to form zinc titanate, adding the thus formed zinc titanate to the catalytic grade alumina, adding cobalt and molybdenum to the catalytic grade alumina, and calcining the catalytic grade alumina to which zinc titanate, cobalt and molybdenum have been added in the presence of oxygen at a temperature in the range of about 500° to about 650° C., said cobalt and molybdenum being present in said catalyst composition in the oxide form after the calcining step.

4. A process in accordance with claim 1 wherein the total concentration of the oxides of titanium, cobalt, zinc and molybdenum is in the range of about 3 to about 35 weight percent based on the total weight of the catalyst composition.

5. A process in accordance with claim 4 wherein the concentration of the oxide of titanium plus the concentration of the oxide of zinc is in the range of about 2 to about 25 weight percent based on the weight of the total catalyst composition and the concentration of the cobalt oxide plus the concentration of the molybdenum oxide is in the range of about 2 to about 25 weight percent based on the weight of the total catalyst composition.

6. A process in accordance with claim 4 wherein the concentration of the oxide of titanium plus the concentration of the oxide of zinc is in the range of about 5 to about 15 weight percent based on the weight of the total catalyst composition and the concentration of the cobalt oxide plus the concentration of the molybdenum oxide is in the range of about 10 to about 20 weight percent based on the weight of the total catalyst composition.

7. A process in accordance with claim 1 wherein the atomic ratio of zinc to titanium in said catalyst composition is in the range of about 1:1 to about 3:1 and the atomic ratio of cobalt to molybdenum in said catalyst composition is in the range of about 0.1:1 to about 3:1.

8. A process in accordance with claim 1 wherein the atomic ratio of zinc to titanium in said catalyst composition is in the range of about 1.8:1 to about 2.2:1 and the atomic ratio of cobalt to molybdenum in said catalyst composition is in the range of about 0.6:1 to about 0.7:1.

9. A process in accordance with claim 1 wherein said organic nitrogen compound is contained in a fluid feed stream.

10. A process in accordance with claim 9 wherein said fluid feed stream contains aromatic hydrocarbons.

11. A process in accordance with claim 9 wherein said suitable hydrodenitrogenation conditions comprise a temperature in the range of about 205° C. to about 538° C., a total system pressure in the range of 200 psig to about 3000 psig, a hydrogen flow rate in the range of about 100 to about 10,000 SCF/bbl and a residence time for said fluid feed stream in the presence of said catalyst composition in the range of about 0.1 to about 20 liquid volumes of said fluid feed stream per volume of said catalyst composition per hour.

12. A process in accordance with claim 9 wherein said suitable hydrodenitrogenation conditions comprise a temperature in the range of about 316° C. to about 427° C., a total system pressure in the range of 400 psig to about 1000 psig, a hydrogen flow rate in the range of about 500 to about 3000 SCF/bbl and a residence time for said fluid feed stream in the presence of said catalyst composition in the range of about 1 to about 5 liquid volumes of said fluid feed stream per volume of said catalyst composition per hour.

13. A process in accordance with claim 9 additionally comprising the steps of:
discontinuing the flow of said fluid feed stream over said catalyst composition; and
contacting said catalyst composition, after the flow of said fluid feed stream is discontinued, with a free oxygen-containing fluid under suitable regeneration conditions to thereby regenerate said catalyst composition.

14. A process in accordance with claim 13 wherein said suitable regeneration conditions comprise a feed rate of said free oxygen-containing fluid suitable to remove substantially all of the carbonaceous deposits from said catalyst composition, a temperature in the range of about 425° C. to about 650° C., and a pressure in the range of about 400 to about 1000 psig.

15. A process in accordance with claim 13 additionally comprising the step of purging said catalyst composition with an inert fluid after the step of terminating the flow of said fluid feed stream and before the step of regenerating said catalyst composition.

16. A process in accordance with claim 13 additionally comprising the steps of:
    terminating the flow of said free oxygen-containing fluid over said catalyst composition after said catalyst composition is substantially regenerated;
    purging said catalyst composition with an inert fluid after the flow of said free oxygen-containing fluid is terminated;
    terminating the flow of said inert fluid over said catalyst composition after said free oxygen-containing fluid is substantially purged from said catalyst composition; and
    recontacting said catalyst composition with said fluid feed stream after the flow of said inert fluid is terminated.

17. A process in accordance with claim 1 wherein said catalyst composition is completely sulfided prior to the step of contacting said organic nitrogen compound with said catalyst composition.

18. A process in accordance with claim 17 wherein said catalyst composition is completely sulfided by contacting a substantially unsulfided catalyst composition with hydrogen sulfide at a temperature in the range of about 175° C. to about 225° C. until hydrogen sulfide is detected in the effluent flowing from said catalyst composition and then contacting said catalyst composition with hydrogen sulfide at a temperature in the range of about 350° C. to about 400° C. until hydrogen sulfide is detected in the effluent flowing from said catalyst composition.

* * * * *